United States Patent [19]

Madonio et al.

[11] Patent Number: 5,078,533
[45] Date of Patent: Jan. 7, 1992

[54] DRIVELINE YOKE WITH IMPROVED SEAL RETAINER

[75] Inventors: Andrew M. Madonio, Machesney Park; Bruce S. Giersch, Harvard, both of Ill.

[73] Assignee: Rockford Powertrain, Inc., Rockford, Ill.

[21] Appl. No.: 723,570

[22] Filed: Jul. 1, 1991

[51] Int. Cl.⁵ ............................................. B25G 3/00
[52] U.S. Cl. .................................. 403/288; 403/359; 464/133; 277/189
[58] Field of Search ................ 403/359, 288; 464/133; 277/183, 189

[56] References Cited

U.S. PATENT DOCUMENTS

| | | | |
|---|---|---|---|
| 3,554,180 | 1/1971 | Lesser | 277/189 X |
| 4,131,375 | 12/1978 | Fisher | 403/359 X |
| 4,379,707 | 4/1983 | Fisher | 403/359 X |
| 4,592,556 | 6/1986 | Nieman et al. | 464/133 X |

*Primary Examiner*—Andrew V. Kundrat
*Attorney, Agent, or Firm*—Leydig, Voit & Mayer, Ltd.

[57] ABSTRACT

A seal is held against the end of the sleeve of a driveline yoke by a retainer formed with angularly spaced windows having axially facing edges which snap past and lock behind angularly spaced lugs on the sleeve when the retainer is telescoped onto the sleeve. Release of the retainer is effected by twisting the retainer to cause circumferentially facing side edges of the windows to cam against sloped side surfaces of the lugs and deflect the axially facing edges of the windows outwardly from behind the lugs so as to permit the retainer to be slipped axially off of the sleeve.

5 Claims, 2 Drawing Sheets

DRIVELINE YOKE WITH IMPROVED SEAL RETAINER

BACKGROUND OF THE INVENTION

This invention relates to a driveline yoke and, more particularly, to a yoke having an internally splined sleeve adapted to telescopically receive an externally splined shaft. An annular seal for retaining lubricant in the sleeve and for preventing contaminants from entering the sleeve is secured against an end of the sleeve by a removable cup-like retainer.

In some prior yokes, the retainer is screwed onto the end portion of the sleeve. This, however, requires that the retainer be internally threaded and that the end portion of the sleeve be externally threaded. Also, there is a possibility of the threaded retainer working loose when subjected to severe vibrational forces over a long period of time.

Other types of prior yokes are equipped with a snap-on retainer having angularly spaced locking tangs which are bent inwardly when the retainer is formed. The tangs snap into and interlock with an annular groove in the sleeve of the yoke when the retainer is telescoped onto the sleeve. While such a retainer is held securely, the tangs must be forceably pried out of the groove in order to remove the retainer and often are bent and rendered useless. Rather complex tooling is required to bend the tangs when the retainer is manufactured.

SUMMARY OF THE INVENTION

The general aim of the present invention is to provide a relatively simple and inexpensive retainer which may be snapped axially onto and locked securely on the sleeve of a yoke and which may be released without damage by rotating the retainer relative to the sleeve.

A more detailed object of the invention is to achieve the foregoing by providing a yoke whose sleeve is formed with angularly spaced lugs which are uniquely shaped to coact with angularly spaced windows in the retainer to hold the retainer on the sleeve with an axial snap fit while effecting release of the snap fit when the retainer is rotated on the sleeve.

The invention also resides in the provision of cam surfaces on one axially facing end and one circumferentially facing side of each lug to enable the retainer to be secured to the sleeve with a snap-on motion and to be released from the sleeve with a twist-off motion.

Still another object of the invention is to use the resiliency of the seal to advantage to help hold the retainer securely on the sleeve.

These and other objects and advantages of the invention will become more apparent from the following detailed description when taken in conjunction with the accompanying drawings.

DETAILED DESCRIPTION OF THE PREFERRED EMBODIMENT

Figure 1:
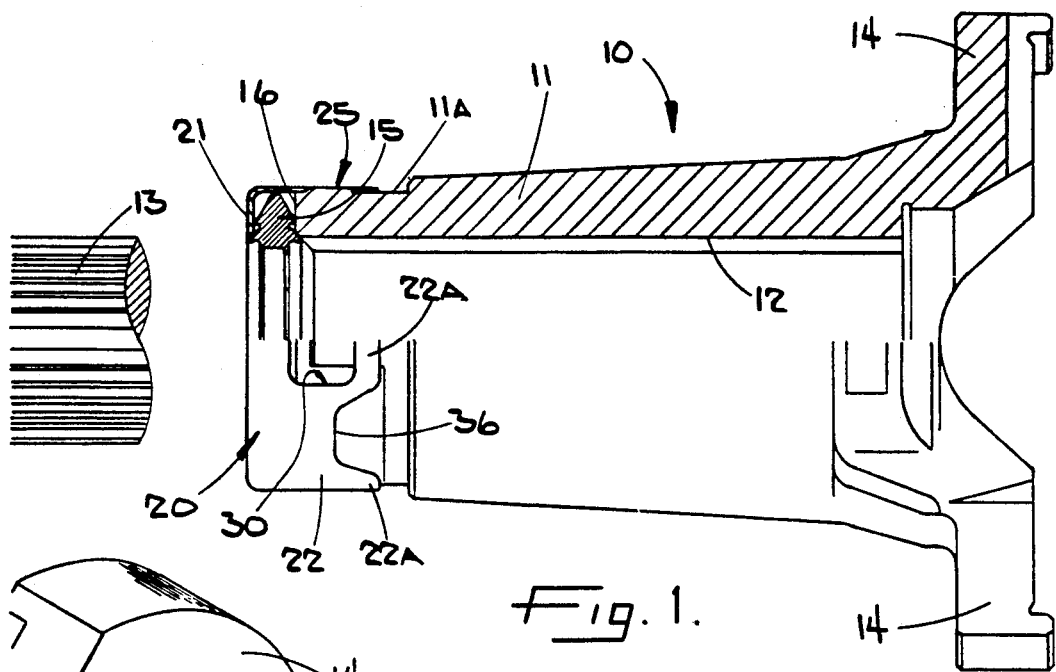
FIG. 1 is a side elevational view of a new and improved driveline yoke equipped with a unique retainer incorporating the features of the present invention, certain portions of the yoke being broken away and shown in section.

For purposes of illustration, the invention has been shown in the drawings in conjunction with a slip yoke 10 of the type used in a drivetrain for an off-road vehicle or the like. The yoke includes a sleeve portion 11 formed with an axially extending splined bore 12 for receiving an externally splined drive shaft 13. Diametrically spaced ears 14 extend from one end of the sleeve 11 of the yoke 10 and serve as attachment points for straps (not shown) for securing a universal joint cross (not shown) or the like to the yoke. In this particular instance, the yoke is cast or forged from iron and the sleeve is subsequently subjected to a turning operation for purposes of balancing the yoke.

An annular seal 15 made of rubber or other resiliently yieldable material engages the extreme axially facing end 16 of the sleeve 11 and embraces the shaft 13 to seal lubricant in the sleeve while excluding contaminants from the sleeve. The seal 15 is held in engagement with the sleeve end 16 by a retainer 20 which preferably is stamped or drawn from spring steel or other resiliently yieldable material. Herein, the retainer includes an annular and radially extending end wall 21 spaced axially from the sleeve end 16 and serving to captivate the seal 15 axially against the sleeve. Formed integrally with and extending from the end wall 21 is a cylindrical skirt 22 adapted to telescope over a reduced-diameter end portion 11A of the sleeve 11 and adapted to confine the seal radially.

According to the present invention, the end portion 11A of the sleeve 11 is formed with a plurality of angularly spaced lugs 25 which enable the retainer 20 to be snapped onto and securely fastened to the sleeve and which enable the retainer to be released from the sleeve with a simple twisting motion. As a result of the lugs, the retainer may be of extremely simple and inexpensive construction and may be removed repeatedly from the sleeve without being damaged.

Figure 2:
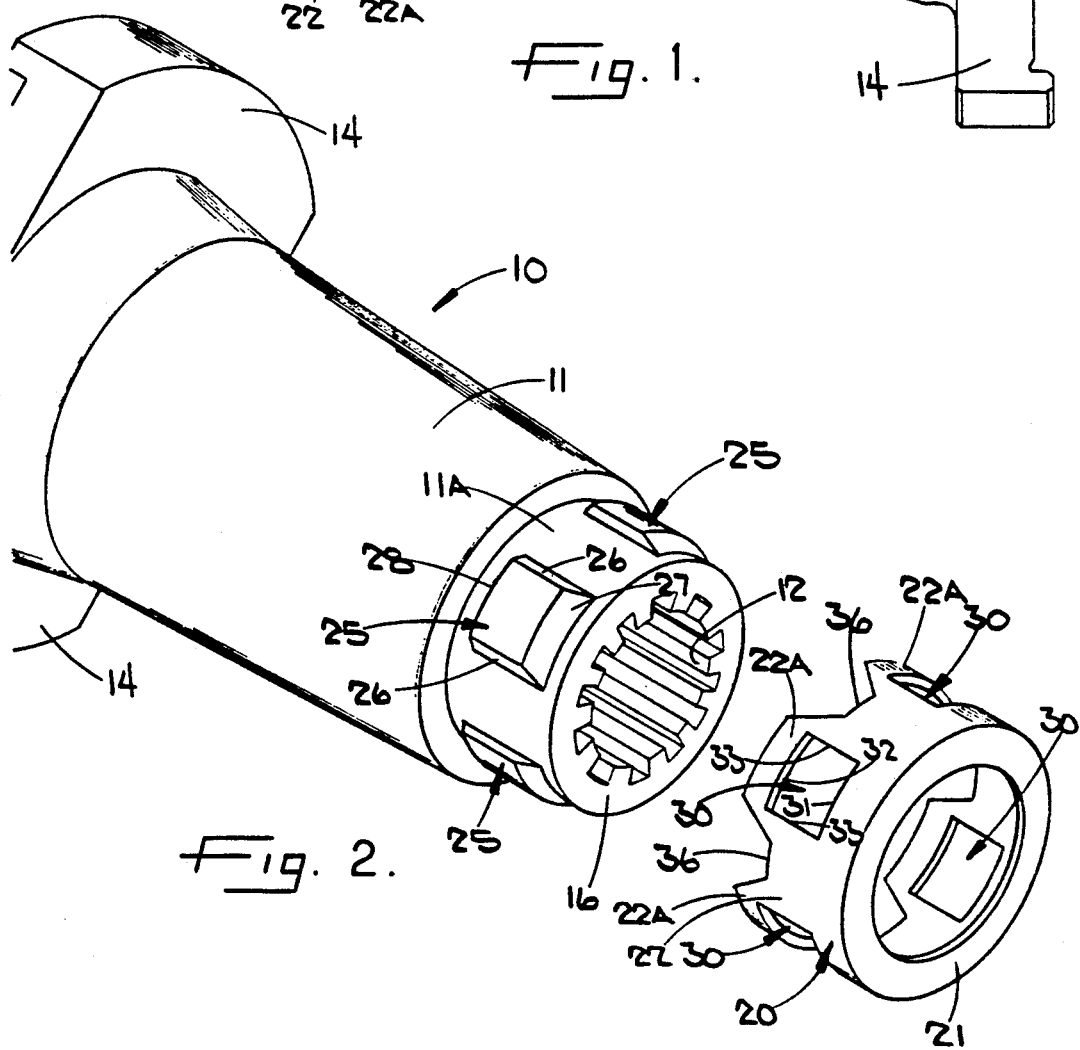
FIG. 2 is an exploded perspective view of the yoke and the retainer.
Figure 4:
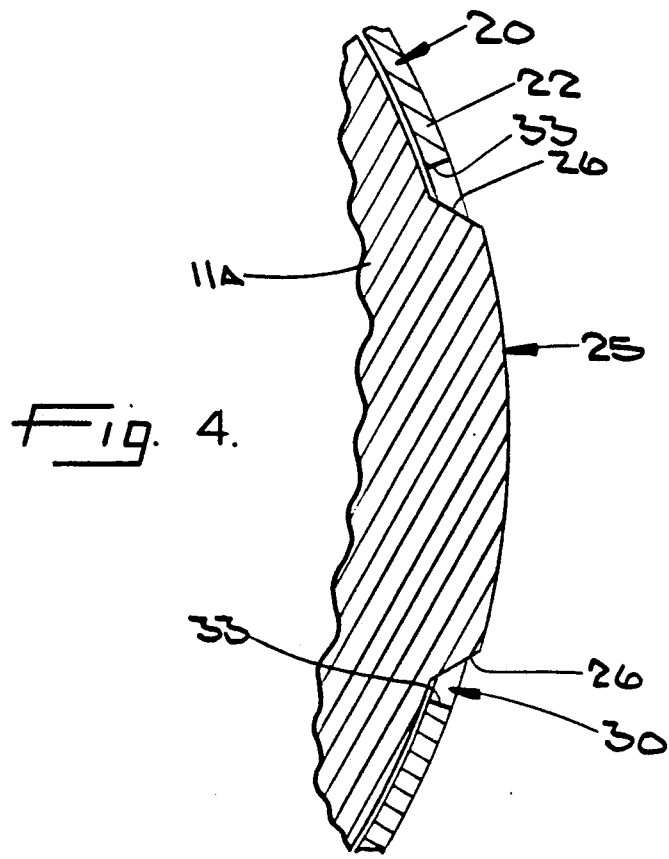
FIG. 4 is a fragmentary cross-section taken substantially along the line 4—4 of FIG. 3.

In this particular instance, four equally spaced and radially outwardly projecting lugs 25 are formed on the reduced-diameter sleeve portion 11A between the ends thereof. Each lug is generally rectangular in shape and includes two circumferentially facing and generally axially extending side edges 26 (FIGS. 2 and 4). At least one (and preferably both) of the side edges defines a cam surface and, to this end, each side edge is sloped so as to progress radially inwardly upon proceeding circumferentially away from the lug.

Figure 3:
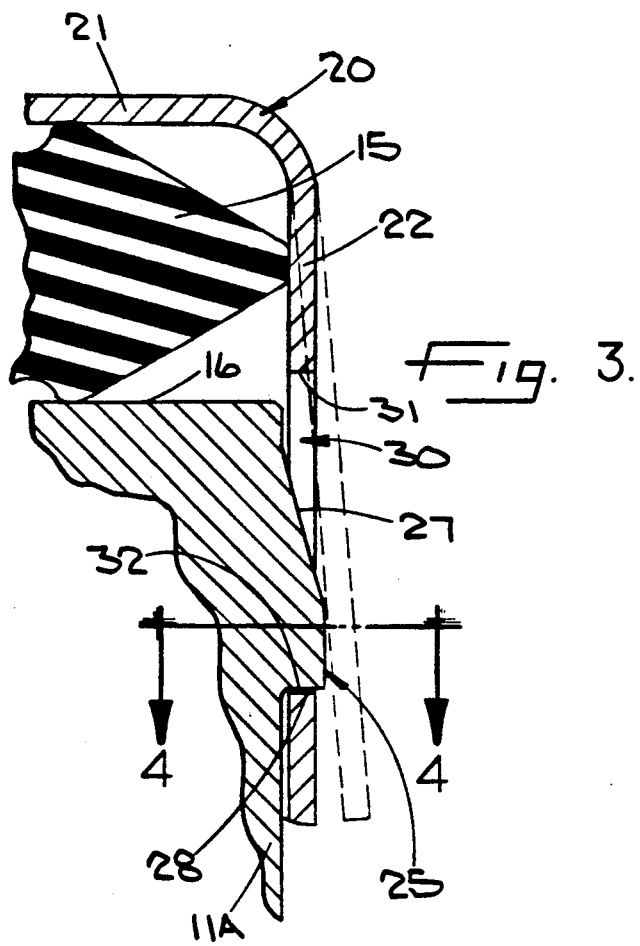
FIG. 3 is an enlarged fragmentary cross-section showing the retainer installed on the sleeve of the yoke.

Each lug 25 also includes axially and oppositely facing ends 27 and 28 (FIG. 3). The lug end 27 is located adjacent the end 16 of the sleeve 11 and defines a cam surface which is sloped so as to progress radially inwardly upon proceeding axially away from the lug. The opposite lug end 28 defines a right-angled shoulder which is located in a plane extending substantially perpendicular to the axis of the sleeve.

As shown most clearly in FIG. 2, the skirt 22 of the retainer 20 is formed with four generally rectangular openings or windows 30 which are somewhat larger than the lugs 25. Each window includes a pair of axially and oppositely facing edges 31 and 32 (FIG. 3) and a pair of circumferentially and oppositely facing edges 33 (FIG. 4). The edges 31 and 32 are disposed in parallel planes extending substantially perpendicular to the axis of the skirt 22.

Installation of the seal 15 and the retainer 20 is effected by placing the seal in the retainer at the junction of the end wall 21 and the skirt 22 and by locating the assembly relative to the sleeve 11 in the position shown in FIG. 2. The retainer then is moved axially and is telescoped onto the reduced end portion 11A of the sleeve. As an incident thereto, the free edge of the skirt 22 encounters the cam surfaces 27 of the lugs 25 to cause the skirt to be deflected outwardly as shown in phantom lines in FIG. 3. This enables the skirt to slip past the lugs and, as soon as the edges 32 of the windows 30 move past the shoulders 28 of the lugs, the resiliency of the skirt causes the skirt to spring inwardly to its normal position. This snaps the edges 32 of the windows behind the shoulders 28 to lock the retainer 20 securely on the sleeve portion 11A. Advantageously, the elastomeric seal 15 is compressed between the end 16 of the sleeve 11 and the end wall 21 of the retainer 20 when the edges 32 are located behind the shoulders 28. Thus, the compressed seal urges the edges 32 into engagement with the shoulders 28 to help hold the retainer securely in place.

Removal of the retainer 20 may be effected simply by placing a wrench on the retainer and turning the retainer through a slight angle. As the retainer is turned, the appropriate side edges 33 of the windows 30 engage the adjacent cam surfaces 26 of the lugs 25 to deflect the skirt 22 outwardly and to cause the edges 32 to move radially outwardly from behind the shoulders 18. The retainer then may be removed simply by pulling the retainer axially off of the sleeve portion 11A.

To promote deflection of the skirt 22 during installation and removal of the retainer 20, axially opening notches 36 (FIG. 2) are formed in the free edge portion of the skirt with each notch being located between adjacent windows 30. Thus, the notches cause the free edge portion of the skirt to be formed as angularly spaced segments 22A of relatively short angular length. Such segments deflect with relative ease when their free edges engage the cam surfaces 27 of the lugs 25 during installation of the retainer and when the edges 33 of the windows 30 engage the cam surfaces 26 during release of the retainer.

From the foregoing, it will be apparent that the present invention brings to the art a new and improved yoke 10 in which the lugs 25 of the sleeve 11 coact with the windows 30 of the retainer 20 to allow the retainer to be installed with an axial snap-on action and to be released with a rotary twist-off action. The retainer is of extremely inexpensive construction in that the retainer may be formed by a simple stamping and drawing operation and requires no machining. The lugs 25 may be formed as an incident to casting or forging the yoke 10 and require little or no machining. If it is necessary to machine the shoulders 28 for squareness, such machining may be accomplished by the same turning operation which is performed to balance the yoke.

We claim:

1. A driveline yoke having an internally splined sleeve, a retainer adapted to be telescoped onto and secured detachably to said sleeve, said sleeve having a series of angularly spaced and radially outwardly projecting lugs, said retainer having an axially extending and resiliently yieldable skirt formed with a series of angularly spaced openings for receiving said lugs, said openings having axially facing edges and having circumferentially facing edges, said lugs being shaped to momentarily cam said skirt outwardly as an incident to said skirt being telescoped onto said sleeve and to thereafter lock against said axially facing edges of said openings to captivate said retainer axially on said sleeve, and said lugs also being shaped to cam against said circumferentially facing edges of said openings when said retainer is rotated on said sleeve and to deflect said skirt outwardly so as to release said axially facing edges of said openings from said lugs and permit axial removal of said retainer from said sleeve.

2. A driveline yoke as defined in claim 1 in which said sleeve includes an axially facing end, said retainer including an annular and radially extending end wall formed integrally with said skirt and disposed in axially spaced relation with the end of the sleeve, and an annular seal of resiliently yieldable material compressed between the end of said sleeve and the end wall of said retainer and biasing said retainer axially away from said sleeve so as to urge said axially facing edges of said openings into locking engagement with said lugs.

3. A driveline yoke as defined in claim 1 in which said lugs and said openings are generally rectangular, the axially facing edges of said openings being disposed in planes extending substantially perpendicular to the axis of said sleeve, each of said lugs having a first end defining a first cam surface, having an opposite end defining an axially facing shoulder, and having a circumferentially facing side edge defining a second cam surface, the first cam surface of each lug being sloped so as to progress radially inwardly upon proceeding axially away from the lug, the second cam surface of each lug being shaped so as to progress radially inwardly upon proceeding circumferentially away from the lug.

4. A driveline yoke as defined in claim 2 in which said lugs and said openings are generally rectangular, the axially facing edges of said openings being disposed in planes extending substantially perpendicular to the axis of said sleeve, each of said lugs having a first end defining a first cam surface, having an opposite end defining an axially facing shoulder, and having a circumferentially facing side edge defining a second cam surface, the first cam surface of each lug being sloped so as to progress radially inwardly upon proceeding axially away from the lug, the second cam surface of each lug being shaped so as to progress radially inwardly upon proceeding circumferentially away from the lug.

5. A driveline yoke having an internally splined sleeve, said sleeve having an end portion with an axially facing end, an annular seal made of resiliently yieldable material engageable with the axially facing end of the sleeve, and a retainer cap made of resiliently yieldable metal for holding said seal in assembled relation with said sleeve, said cap having a radially extending end wall engageable with said seal and having an integral skirt extending axially from said end wall and sized to telescope over said end portion of said sleeve, a plurality of circumferentially spaced and generally rectangular openings formed through said skirt, each of said openings having a pair of opposing axially facing edges and having a pair of opposing circumferentially facing edges, a plurality of circumferentially spaced and generally rectangular lugs formed integrally with said sleeve and projecting radially outwardly from said sleeve and into said openings, each of said lugs having a first end adjacent said end of said sleeve and defining a first cam surface, having an opposite end defining an axially facing shoulder, and having a circumferentially facing side edge defining a second cam surface, the first cam surface of each lug being sloped so as to progress radially inwardly upon proceeding axially away from the lug, the second cam surface of each lug being sloped so as to progress radially inwardly upon proceeding circumferentially away from the lug, said skirt engaging said first cam surfaces of said lugs and being deflected outwardly thereby as said skirt is telescoped over said end portion of said sleeve, said skirt thereafter springing inwardly to cause one of the axially facing edges of each opening to lock against the shoulder of the respective lug and thereby captivate said cap on said sleeve with the radially extending end wall of the cap engaging said seal, rotation of said cap in one direction causing one of the circumferentially facing edges of each opening to engage the second cam surface of the respective lug and to deflect said skirt outwardly so as to release said one axially facing edge of such opening from the shoulder of the lug and permit axial removal of said cap from said sleeve.

* * * * *